United States Patent Office 3,634,505
Patented Jan. 11, 1972

3,634,505
BIS (CHLOROSULFENYL) AND BIS (CHLORO-
SULFONYL)-CARBORANES
Hansjuergen A. Schroeder, Hamden, and Nick S.
Semenuk, New Haven, Conn., assignors to Olin Mathieson Chemical Corporation
No Drawing. Filed May 2, 1968, Ser. No. 726,195
Int. Cl. C07c 143/70, 145/00
U.S. Cl. 260—543 H    8 Claims

ABSTRACT OF THE DISCLOSURE

Bis(chlorosulfenyl)-carboranes are prepared by reacting a bismercapto-ortho, -meta or -para-carborane with chlorine in an inert solvent. The bis(chlorosulfenyl)-carboranes thus formed can, in turn, be oxidized in the presence of sodium hypochlorite to yield the corresponding bis(chlorosulfonyl) -ortho, -meta and -para-carboranes. Both the bis(chlorosulfenyl)-, and the bis(chlorosulfonyl)-carboranes are useful as high energy fuels when compounded with oxidizers.

This invention relates to a process for the preparation of bis(chlorosulfenyl)carboranes and to the products produced thereby. More particularly, this invention in one aspect relates to a process in which chlorine is reacted directly with bismercapto-ortho, -meta or -para-carborane to yield the corresponding bis-sulfenyl derivatives. A second aspect of this invention relates to the oxidation of the thus-formed bis(chlorosulfenyl)-carboranes to the corresponding bis(chlorosulfonyl)-carboranes in the presence of sodium hypochlorite. The invention herein described was made in the course of or under a contract or subcontract thereunder with the Department of the Navy.

The novel bis(chlorosulfenyl)-carboranes of this invention have the formula:

ClS—A—SCl wherein A represents the ortho carboranylene radical, the meta carboranylene radical or the para carboranylene radical.

The novel bis(chlorosulfonyl) carboranes of this invention have the formula:

ClO$_2$S—A—SO$_2$Cl wherein A represents the ortho carboranylene radical, the meta carboranylene radical or the para carboranylene radical.

PREPARATION OF BIS(CHLOROSULFENYL)-CARBORANES

The novel bis(chlorosulfenyl)-carboranes of this invention are prepared by reacting chlorine with a bis-mercapto-carborane in the presence of an inert solvent, such as carbon tetrachloride.

The temperature at which the reaction is conducted can be varied widely from about —30° to about +20° C. or more depending upon the particular reaction conditions employed. Preferably, the reaction is conducted at a temperature range from about —30° to about +10° C. Advantageously, an inert atmosphere is maintained by means of a nitrogen or argon sweep, for example, in the free space of the reactor above the reaction mixture. Although high yields of the desired product may be obtained by employing a stoichiometric quantity of chlorine with the starting bismercapto-carborane, if desired, as much as 120 percent of the stoichiometric requirement of chlorine may be utilized. Gaseous as well as liquid chlorine may be employed. Preferably the chlorine is introduced into the reactor as a solution in an inert solvent which can be, for example, carbon tetrachloride, ethylene chloride, methylene bromide, ethylene bromide, etc. Depending upon the particular temperature utilized and other reaction conditions the reaction time will generally vary from about 0.1 to about 2 hours or more. A wide variety of inert solvents, such as carbon tetrachloride, ethylene chloride, methylene bromide, ethylene bromide, etc. may be employed.

The crude bis-sulfenyl product can be recovered from the reaction mixture by a number of methods well known in the art, such as by evaporating off the inert solvent following which the pure product may be obtained by distillation or recrystallization of the crude product from a suitable solvent, such as acetonitrile, hexane or methylene chloride. Other methods of recovery of the crude product from the reaction mixture, such as by extraction, can be utilized. The pure product likewise can be obtained by sublimation of the crude or impure product and by other methods well known in the art.

Although the reaction is conveniently carried out at atmospheric pressure, subatmospheric pressures as well as pressures of up to about +5 atmospheres can be employed. The reaction takes place without the application of external heat and one of the by-products of the reaction is hydrogen chloride which is evolved from the reaction mixture.

The term "carborane" is a generic term used to describe all three isomers of dicarbaclosododecaborane having the empirical formula:

$$B_{10}C_2H_{12}$$

The ortho isomer of carborane, i.e., ortho carborane or o-carborane is represented by the following formula:

The term ortho carboranylene is applied to the radical derived from ortho carborane having the formula:

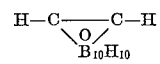

Meta carborane or m-carborane is represented by the formula:

$$H—CB_{10}H_{10}C—H$$

and the m-carboranylene radical is likewise shown by:

$$—CB_{10}H_{10}C—$$

Finally, the para isomer of carborane is represented by the formula:

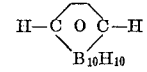

and the corresponding carboranylene radical; i.e., para-carboranylene has the formula:

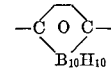

o-Carborane can be conveniently prepared by the process set forth in Clark U.S. Pat. 3,062,756. For example, o-carborane can be prepaed by reacting decaborane, diethyl sulfide and acetylene in an autoclave at 140° C. for about 3 hours. m-Carborane can be prepared by heating o-carborane in a sealed tube at a temperature above 475° C. for about 5 to 20 hours. If o-carborane, m-carborane or a mixture thereof is heated in a pressure bomb at a temperature of from about 550° C. to about 630° C. for about 1 to 30 hours or more, p-carborane is obtained.

The reaction by which the novel bis(chlorosulfenyl)-carboranes of this invention are prepared is shown below where for purposes of illustration the preparation of 1,7-bis(chlorosulfenyl)-m-carborane is shown:

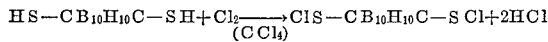

Useful starting materials in the process of this invention include mercapto-substituted carboranes which include 1,2-bismercapto-o-carborane, 1,7 - bismercapto-m-carborane and 1,12-bismercapto-p-carborane.

The above-mentioned carborane derivatives can be conveniently prepared by the process set forth below wherein for example the compound 1,7-bis-mercapto-m-carborane is prepared.

A slurry of 1,7-dilithio-m-carborane (LiCB$_{10}$H$_{10}$CLi) (0.174 mole) in ether (200 ml.) is prepared under an atmosphere of nitrogen and the slurry cooled in an ice bath with rapid stirring. At a temperature of about 5° C., powdered sulfur (0.366 mole) is added through an addition funnel and the rate of addition is adjusted to maintain a reaction mixture temperature below 10° C. for 1 hour. Then the reaction mixture is allowed to warm slowly to ambient temperature and the reaction mixture is stirred for about 16 hours. Hydrochloric acid (200 ml. of a 20 percent solution) is added to the reaction mixture and after a few minutes, two liquid phases form which were separated in a separatory funnel and the ether layer dried over anhydrous magnesium sulfate. The ether is removed under vacuum, yielding a yellow solid. The solid is sublimed at 100°–140° C. in vacuo and the resulting crystals are recrystallized from aqueous ethanol to provide about 7.1 grams of white bismercapto-m-carbonane, M.P. 164–165° C.

PREPARATION OF BIS(CHLOROSULFONYL)-CARBORANES

The bis(chlorosulfenyl)-carboranes formed as previously set forth can be readily converted to the corresponding bis(chlorosulfonyl)-carborane by oxidation in the presence of sodium hypochlorite. Any of the bis(chlorosulfenyl)-carborane derivatives, that is, the 1,2-bis(chlorosulfenyl-o-carborane, the 1,7 - bis(chlorosulfenyl)-m-carborane or the 1,12-bis(chlorosulfenyl)-p-carborane may be utilized as starting materials in the oxidation step. Generally, the temperature of the oxidation reaction will range from about 0° to about 60° C. or more although preferably the reaction is carried out in the temperature range of from about +15° to about +40° C. Advantageously, an inert atmosphere, such as that of nitrogen or argon, etc., is maintained in the reactor free space above the reaction mixture. The reaction is preferably carried out in the presence of an inert solvent, such as carbon tetrachloride, ethylene chloride, methylene bromide, ethylene bromide, etc. The strength of the aqueous sodium hypochlorite solution employed can be varied over a wide range and generally will be from about 2 to about 5 percent by weight of sodium hypochlorite. Depending upon the particular reaction conditions employed, the time of reaction will vary widely although usually it will be from about 0.1 to about 10 hours. At the conclusion of the reaction the inert solvent layer is separated from the water layer, washed with water and then dried over an appropriate desiccant such as sodium sulfate. Recovery of the product can be achieved in a number of ways, e.g., by evaporation of the inert solvent. The pure product can be obtained by recrystallization from a solvent such as acetonitrile, benzene, hexane, cyclohexane, etc.

The solid chlorosulfenyl and chlorosulfonyl carborane products of this invention when incorporated with suitable oxidizers such as ammonium perchlorate, potassium perchlorate, sodium perchlorate and the like in an amount equal to about 15–25 percent by weight of the carborane derivatives yield solid propellants suitable for rocket power plants. These propellants burn with high flame speeds, have high heats of combustion and are of the high specific impulse type. In addition to the oxidizer and oxidizable material the propellant composition may also contain an artificial resin, such as a partially condensed urea-formaldehyde or phenol formaldehyde resin in an amount of about 5 to about 10 percent by weight of the oxidizer and the boron compound. The ingredients can be mixed with simultaneous removal of solvent after which the solvent free mixture can be molded into any desired shape as by extrusion. Curing of the resin can then be accomplished by heating at moderate temperatures.

The following exampes illustrate various embodiments of this invention and are to be considered not limitative:

EXAMPLE I

1,7-bis(chlorosulfenyl)-m-carborane

A solution of 10.42 g. (0.05 mole) 1,7 - bismercapto-m-carborane in 100 ml. of carbon tetrachloride was cooled to −20° C. and stirred mechanically under a nitrogen blanket. To this solution, maintained at −20 to −15° C. there was added over a one-hour period, a solution of 7.80 g. (0.11 mole) of chlorine in 100 ml. of carbon tetrachloride. The resulting solution was allowed to warm slowly to room temperature and then permitted to stand at room temperature under nitrogen overnight. Evaporation of the carbon tetrachloride solution yielded an orange-yellow residue (14.3 g.) which was vacuum distilled to yield 9.22 g. (66 percent) of 1,7-bis(chlorosulfenyl)-m-carborane having the formula:

B.P. 92–93° C./0.15 mm.; $n_D^{25}$ 1.6173.

*Analysis.*—Calcd. for $C_2H_{10}B_{10}Cl_2S_2$ (percent): C, 8.66; H, 3.61; B, 38.99; Cl, 25.58; S, 23.13. Found (percent): C, 9.11; H, 3.79; B, 39.07; Cl, 25.6; S, 22.50.

EXAMPLE II

1,2-bis(chlorosulfenyl)-o-carborane

To a mechanically stirred solution of 10.42 g. (0.05 mole) 1,2-bismercapto-o-carborane in 100 ml. of carbon tetrachloride maintained at −20° to −17° C. under nitrogen, there was added a solution of 7.80 g. (0.11 mole) chlorine in 100 ml. of carbon tetrachloride. After an addition time of 45 minutes, the solution was allowed to come to room temperature slowly. After standing overnight, the carbon tetrachloride was evaporated leaving a residue of 14.0 g. crude 1,7-bis(chlorosulfenyl)-o-carborane. A portion of this residue was recrystallized from acetonitrile to yield pure 1,7-bis(chlorosulfenyl)-o-carborane of the formula

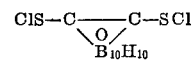

yellow solid, M.P. 79–80° C.

*Analysis.*—Calcd. for $C_2H_{10}B_{10}Cl_2S_2$ (percent): C, 8.66; H, 3.61; B, 38.99; Cl, 25.58; S, 23.13. Found (percent): C, 8.63; H, 3.65; B, 38.91; Cl, 25.32; S, 23.22.

EXAMPLE III

1,12-bis(chlorosulfenyl)-p-carborane

A total of 4.17 g. (0.02 mole) of 1,12-bis mercapto-p-carborane was dissolved in 50 ml. of carbon tetrachloride. To this magnetically stirred solution, maintained at 0–5° C. under a nitrogen sweep, there was added a solution of 3.12 g. (0.044 mole) of chlorine in 20 ml. of carbon tetrachloride. After an addition time of ½ hour and stirring at <10° C. for 1 hour, the solution was stirred at room temperature overnight. Evaporation of the carbon tetrachloride yielded 5.7 g. of crystalline yellow residue that was partially sublimed at 60–80° C./0.05 mm. A portion of the desired product, which was 1,12-bis(chlorosulfenyl)-p-carborane of the formula:

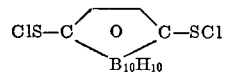

M.P. 71–73° C., was submitted for microanalysis.

*Analysis.*—Calcd. for $C_2H_{10}B_{10}Cl_2S_2$ (percent): C, 8.66; H, 3.61; B, 38.99; Cl, 25.58; S, 23.13. Found (percent): C, 9.18; H, 3.78; B, 39.32; Cl, 24.32; S, 22.30.

EXAMPLE IV

1,7-bis(chlorosulfonyl)-m-carborane

A solution of 2.77 g. (0.01 mole) of 1,7-bis(chlorosulfenyl)-m-carborane in 50 ml. of carbon tetrachloride was mechanically stirred under a nitrogen blanket. To this solution there was added 75 g. (0.044 mole) of ca 5 percent aqueous sodium hypochlorite solution over a 15-minute period. The temperature was kept at 22–30° C. and stirring was continued until virtually all the color had disappeared from the carbon tetrachloride solution. After one hour, the layers were separated and the carbon tetrachloride layer washed with water and then dried over sodium sulfate. Evaporation yielded a soft-white solid (2.50 g.; M.P. 55–60° C.). Recrystallization of a portion of this solid from acetonitrile yielded pure 1,7-bis(chlorosulfonyl)-m-carborane of the formula:

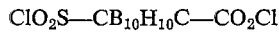

$ClO_2S-CB_{10}H_{10}C-CO_2Cl$

M.P. 61–62° C.

*Analysis.*—Calcd. for $C_2H_{10}B_{10}Cl_2O_4S_2$ (percent): C, 7.04; H, 2.95; B, 31.68; Cl, 20.78; S, 18.79. Found (percent): C, 7.17; H, 2.98; B, 31.93; Cl, 20.6; S, 18.55.

EXAMPLE V

1,12-bis(chlorosulfonyl)-p-carborane

To a solution of 2.77 g. (0.01 mole) of 1,12-bis(chlorosulfenyl)-p-carborane dissolved in 50 ml. of carbon tetrachloride there was added 100 g. (0.058 mole) of ca. 5 percent aqueous sodium hypochlorite solution. The solution was magnetically stirred at room temperature for 3.5 hours, at which time the yellow color of the starting material had disappeared. Then the carbon tetrachloride layer was separated, dried over sodium sulfate and evaporated to yield 3.0 g. crude product (M.P. 175–178° C.). A portion of this product was recrystallized from petroleum ether/bezene to yield pure, 1,12 - bis(chlorosulfonyl)-p-carborane of the formula:

M.P. 181–183° C.

*Analysis.*—Calcd. for $C_2H_{10}B_{10}Cl_2O_4S_2$ (percent): C, 7.04; H, 2.92; B, 31.68; Cl, 20.78; S, 18.79. Found (percent): C, 7.39; H, 3.23; B, 31.42; Cl, 20.88; S, 18.87.

EXAMPLE VI

1,12-bis(chlorosulfonyl)-o-carborane

The crude product was obtained in the same manner as the 1,7-bis(chlorosulfonyl)-m-carborane. It was stable only at low temperature, and could not be purified. The product did, however, show the characteristic sulfonyl chloride absorption in the infrared spectrum.

The boron-containing solid bis(chlorosulfenyl) carboranes and bis(chlorosulfonyl) carboranes materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of the boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided boron-containing material can be admixed with a high solids content solution of partially condensed urea-formaldehyde or phenol-formaldehyde resin, the proportions being such that the amount of resin is about 5 to 10 percent by weight of oxidizer and bis(chlorosulfenyl)- or bis(chlorosulfonyl) carborane compound. The ingredients can be thoroughly mixed with simultaneous removal of solvent, and following this the solvent-free mixture can be molded into the desired shape as by extrusion. Thereafter, the resin can be cured by resorting to heating at moderate temperatures. For further information concerning the formulation of solid propellant compositions, reference is made to U.S. Pat. 2,622,277 to Bonnell and to U.S. Pat. 2,646,596 to Thomas.

What is claimed is:

1. A bis(chlorosulfenyl)-carborane of the formula:

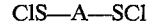

ClS—A—SCl wherein A is selected from the group consisting of the ortho carboranylene radical, the meta carboranylene radical and the para carboranylene radical.

2. The bis(chlorosulfenyl)-carborane of claim 1 wherein A is the ortho carboranylene radical.

3. The bis(chlorosulfenyl)-carborane of claim 1 wherein A is the meta carboranylene radical.

4. The bis(chlorosulfenyl)-carborane of claim 1 wherein A is the para carboranylene radical.

5. A bis(chlorosulfonyl)-carborane of the formula:

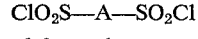

$ClO_2S-A-SO_2Cl$ wherein A is selected from the group consisting of ortho carboranylene radical, the meta carboranylene radical and the para carboranylene radical.

6. The bis(chlorosulfonyl)-carborane of claim 5 wherein A is the ortho carboranylene radical.

7. The bis(chlorosulfonyl)-carborane of claim 5 wherein A is the meta carboranylene radical.

8. The bis(chlorosulfonyl)-carborane of claim 5 wherein A is the para carboranylene radical.

References Cited

Kharasch et al., Chemical Reviews, vol. 39 (1946), pp. 285 and 291.

LORRAINE A. WEINBERGER, Primary Examiner

E. J. GLEIMAN, Assistant Examiner

U.S. Cl. X.R.

149—46, 76, 77; 260—543 R, 606.5 B